United States Patent [19] Hurley

[11] 4,318,814

[45] Mar. 9, 1982

[54] CONTINUOUS CENTRIFUGAL MACHINE

[75] Inventor: Donald L. Hurley, Hamilton, Ohio

[73] Assignee: The Western States Machine Company, Hamilton, Ohio

[21] Appl. No.: 113,745

[22] Filed: Jan. 21, 1980

[51] Int. Cl.$^3$ .............................................. B01D 33/02

[52] U.S. Cl. .................................................... 210/365

[58] Field of Search ........................... 233/3, 20 A, 21; 210/360, 361, 362, 363, 364, 365, 366

[56] References Cited

U.S. PATENT DOCUMENTS

| | | | |
|---|---|---|---|
| 2,104,162 | 1/1938 | Macklind | 233/21 |
| 2,311,606 | 2/1943 | Bannister | 233/21 |
| 2,519,813 | 8/1950 | Bayless | 210/360 R |
| 3,023,949 | 3/1962 | Bankein | 233/21 |
| 3,129,174 | 4/1964 | Pickel et al. | 233/21 |
| 3,283,910 | 11/1966 | Grieselbuber et al. | 210/365 |
| 3,333,707 | 8/1967 | Barnge et al. | 210/365 |
| 4,141,837 | 2/1979 | Heckmann et al. | 210/365 |

*Primary Examiner*—Theodore A. Granger
*Attorney, Agent, or Firm*—Albert C. Johnston; Ronald A. Clayton

[57] ABSTRACT

An improved continuous centrifugal machine includes a rigid base structure, a bearing housing, a normally vertical basket shaft journalled for rotation on bearings in the bearing housing, an upwardly open frusto-conical centrifugal basket secured to the upper end of the basket shaft for rotation therewith, a stationary curb wall mounted on the base structure and surrounding the basket, buffering assemblies for resiliently mounting the bearing housing on the base structure to permit gyration of the basket, and a motor mounted to one side of the curb wall and connected by an improved system to the lower end of the shaft for rotating the basket. In accordance with improvements in the machine an annular support ring is mounted on the base structure within the curb wall and has an upwardly facing surface. An annular chambering unit formed as an integrated structure and supported on the support ring in space between the side wall of the basket and the curb wall includes an annular base wall having an upwardly facing surface supported and seated on the support ring, horizontally spaced outer and inner annular partitions mounted on and projecting upwardly from the base wall and having their respective upper ends disposed adjacent to the upper and lower ends of the side wall of the basket. A floor partition extends between the annular partitions above the base wall and with the annular partitions forms a liquid collecting chamber outside and beneath the side wall. The buffering assemblies are fixed to portions of the base wall and located radially inwardly of the support ring so that the buffering assemblies, the chambering unit, the bearing housing and the basket can be assembled as a unitary structure that as a unit is liftable from and replaceable on the support ring.

4 Claims, 3 Drawing Figures

FIG. 2
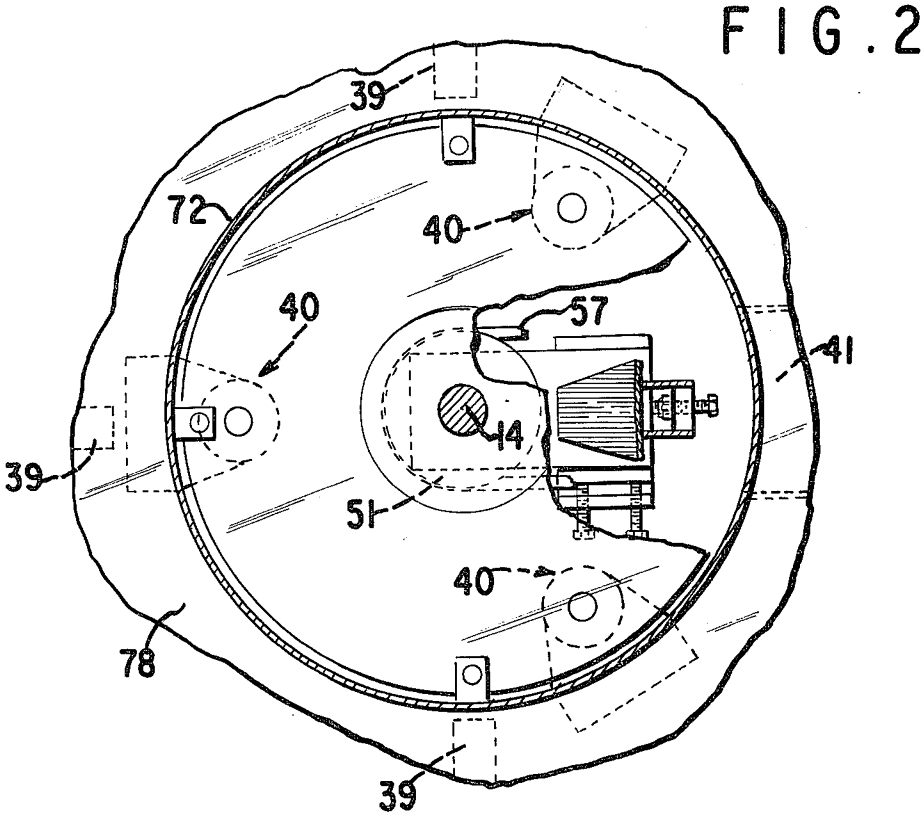
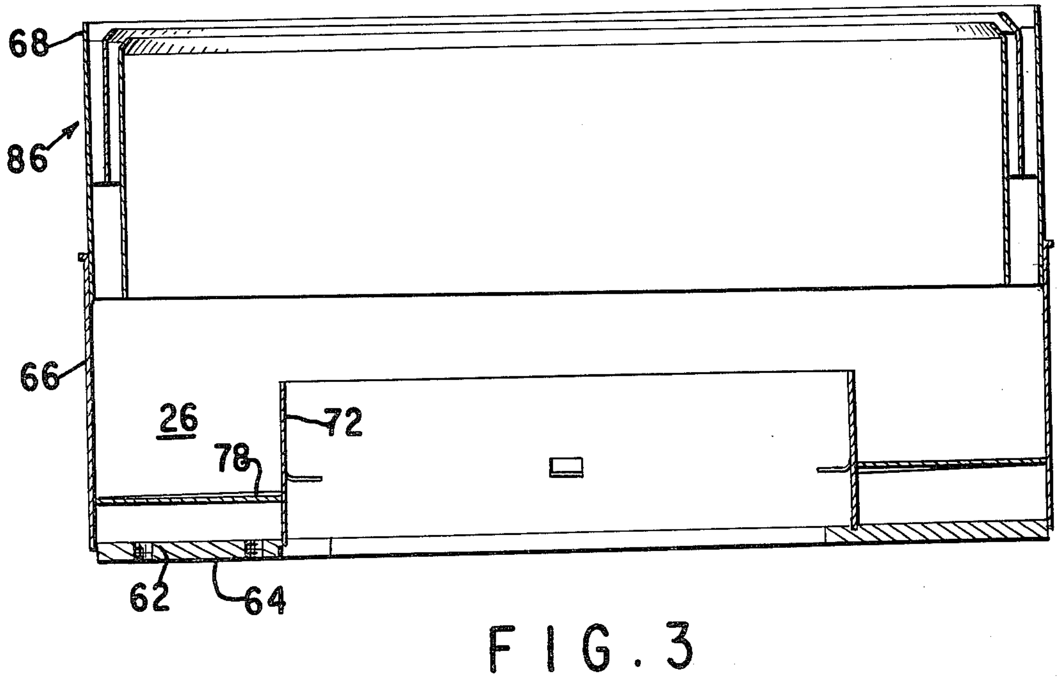
FIG. 3

CONTINUOUS CENTRIFUGAL MACHINE

The present invention relates generally to a continuous centrifugal machine and is particularly directed to an improved arrangement of components including a readily removable chambering unit that forms a liquid collecting chamber outside and beneath the side wall of an upwardly open frusto-conical centrifugal basket.

Continuous centrifugal machines of the conical basket type are particularly useful for separation of sugar crystals from syrup in the manufacture of sugar. Such machines include a frustoconical basket having a perforate circumferential side wall into which a mixture of liquid and solids, for example, massecuite, is fed adjacent the small diameter end of the basket. When the basket is rotated the mixture will continuously travel toward the large diameter end under the influence of centrifugal force. A cylindrical partition concentrically surrounds the basket and has one end proximate to the large diameter end of the basket to define a liquids receiving chamber around the basket. An outer curb wall is spaced from the partition to define therebetween a chamber for receiving solids discharged over the top of the large diameter end of the basket.

In continuous centrifugals of the type described above as disclosed, for instance, in U.S. Pat. No. 3,330,707, the basket is secured to a shaft that is rotated by a drive belt which runs around a pulley secured on the shaft. The drive belt is also operatively connected to a rotary prime mover such as a motor. In such known continuous centrifugal machines, the structure which includes the liquid collecting partition and a liquid outlet is often connected to the supporting base structure by a vertically telescoping slip joint sealed by a packing ring or gland. However, such arrangements make construction and assembly of the machines difficult because the packing ring and means for securing the structures together at the slip joint are difficult to reach. Futher, a bearing housing containing bearings which support the basket shaft is mounted through a system of resilient buffers and rigid hangers to a part of the base structure in an arrangement objectionably restricting access to the buffer assemblies and to the bearings. Also, accommodations provided below the basket for the drive belt and for the outflow of liquids separated by the machine obstruct objectionably the flow of solids from the machine.

It is an object of the invention to provide a continuous centrifugal machine that incorporates an improved integrated structure which constitutes a liquid collecting chamber outside and beneath the side wall of the centrifugal basket and which also can have the mounting system of the bearing housing and the basket unified with it. This integrated structure may be easily assembled with the supporting base structure as well as easily disassembled for repair and maintenance. It is another object of the invention to provide such a continuous centrifugal machine in which the improved integrated structure and the supporting structures for it are arranged so that the basket may be driven by the belt driven from the motor and the liquid separated in the machine taken off with minimal obstruction to flow from the machine of the sugar or other solid products of the separating process.

In general accordance with known technology, the continuous centrifugal machine includes a rigid base structure, a bearing housing, a normally vertical basket shaft journalled for rotation on bearings in the bearing housing, and an upwardly open frusto-conical basket secured to the upper end of the basket shaft for rotation therewith. A stationary curb wall is mounted on the base structure and surrounds the basket. A plurality of resilient buffering assemblies resiliently mount the basket so as to permit gyration of the basket about a point on the axis of the shaft. A rotary drive, includes a belt running beneath the basket between a pulley coupled to its shaft and a driving pulley coupled to a motor mounted to one side of the curb wall.

According to the present invention, a chambering unit formed as an integrated structure is supported on the base structure to occupy the space between the curb wall and the side wall of the basket. Specifically, the base structure within the curb wall is provided with a support ring having an upwardly facing annular load supporting surface. The chambering unit includes an annular base wall having a downwardly facing surface supported on and sealed relative to that ring surface, and radially spaced outer and inner annular partitions are mounted on and project upwardly from the base wall and have respective upper ends disposed adjacent respectively to the upper and lower ends of the side wall of the basket. A floor partition extends between the annular partitions above the base wall and, with the annular partitions, forms a liquid collecting chamber outside and beneath the side wall of the basket. The upper ends of the annular partitions have portions that coact with associated structures on the upper and lower ends of the side wall to diect liquid into the collecting chamber. The base wall and floor partition have a common outlet therethrough for conducting liquid from the collecting chamber, and the floor partition is sloped toward the outlet to flow liquid thereinto from the chamber.

The above, and other objects, features and advantages of this invention will be apparent from the following detailed description of an illustrative embodiment thereof which is to be read in connection with the accompanying drawings.

FIG. 2 is a horizontal cross-sectional view taken through plane 2—2 in FIG. 1

FIG. 3 is a vertical cross-sectional view of the chambering unit similar to that shown in FIG. 1.

Figure 1:
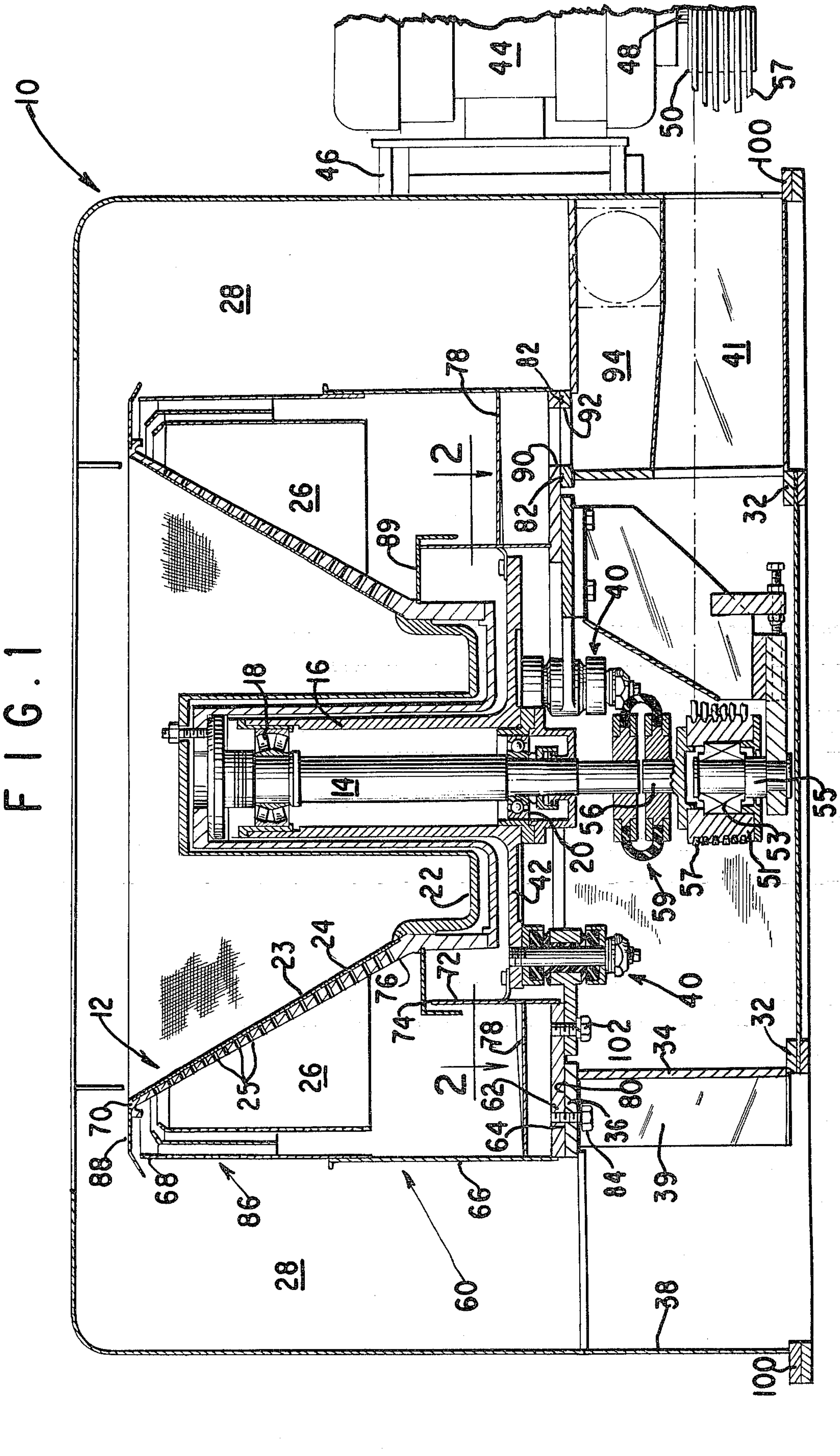
FIG. 1 is a vertical cross-sectional view of a continuous centrifugal machine made in accordance with the present invention.

As shown in FIG. 1, the illustrative embodiment of the improved continuous centrifugal machine of the present invention is generally indicated at 10, and includes a frusto-conical basket 12 mounted for rotation on a normally vertical basket shaft 14 that is supported for rotation in a bearing housing 16 on upper and lower bearings 18 and 20 respectively. The basket may be driven at high rotary speed by a rotary prime mover such as a motor.

When the machine is operated a mixture of liquids and solids to be centrifuged or separated is fed into the basket, while it is continuously rotated, through a supply pipe (not shown) that extends from above the basket and discharges at a location adjacent the bottom surface 22 of the basket. Therefore, the mixture travels upwardly and outwardly along the inner surface of the frusto-conical side wall 23 of the basket under the influence of centrifugal force. A perforated screen 24 is mounted adjacent the side wall of the basket which itself is provided with suitable drain openings 25 that extend therethrough. Thus, as the mixture travels upwardly along the side wall of the basket, centrifugal force also causes liquid portions of it to travel outwardly through the screen and the side wall openings 25 for collection in an inner liquid collecting chamber 26, which will be described below in greater detail. Solid constituents of the mixture are discharged radially outwardly over the top edge of the basket 12 and fall for collection through an outer solids delivering chamber 28, also described in greater detail below.

The continuous centrifugal machine of the present invention incorporates an improved chambering unit formed as an integrated structure. More particularly, a base structure of the centrifugal machine comprises a lower base ring 32 and a cylindrical column 34 secured to and projecting upwardly from the base ring. A radially outwardly extending support ring 36 is mounted on the upper end of the column 34. A curb wall 38 is secured at its lower margin to a curb ring 100. As shown in FIG. 2, three radially arranged stiffening ribs 39 and one arrangement constitutes a belt tunnel 41 that overlies and is vertically coincident with a liquid outlet tunnel 94 extend radially outwardly from the column. The outer edge of support ring 36 is supported inside the curb wall above the base ring 32 by the column 34. At least three resilient, mounting or buffering assemblies, generally indicated at 40 and which may be of the general type described in detail in U.S. Pat. No. 3,333,707 (Bange et al.), are equally spaced about the inner circumference of a base wall 62 that forms part of the chambering unit described in greater detail below. Hangers for the buffering assemblies 40 are secured by bolts 102 to a portion of the inner circumference of the base wall. The bearing housing 16 is formed at its lower end with a flange portion 42 that extends radially outwardly to the buffering assemblies 40. The flexible buffering assemblies 40 flexibly interconnect the base structure and the bearing housing, through the base wall 62 and thereby flexibly mount the bearing housing, the basket shaft and the basket. Therefore, the basket is permitted to gyrate about a point on the axis of its rotation when material in the basket is imbalanced.

A large electric motor 44, the prime mover, is mounted on a suitable mounting bracket 46 on the outside of the curb wall 38 and has a vertically arranged drive shaft 48 that carries a drive pulley 50.

A driven pulley 51 is mounted below the basket on a bearing 53 carried on a support shaft 55. A stub shaft 56 is carried on and for rotation with the driven pulley, and a V-belt 57 is reeved about the driven and drive pulleys. A flexible coupling 59 interconnects the stub shaft and the basket shaft so that the basket can be driven by the motor.

The chambering unit, which is generally indicated at 60 and is shown in detail in FIGS. 1 and 3, is supported on the support ring 36 in the space between the support ring 36 and the side wall of the basket. More particularly, the chambering unit is annular and comprises the radial annular base wall 62 which has a downwardly facing surface 64. An outer annular partition 66 is mounted on and projects upwardly from the base wall in concentric relation about the basket 12 and has an upper end 68 disposed adjacent the upper end 70 of the side wall of the basket.

The unit 60 further includes an inner cylindrical partition 72 that is mounted on and projects upwardly from the base wall and spaced horizontally from the outer partition. The inner partition has an upper end 74 which is disposed adjacent the lower end 76 of the side wall of the basket.

An annular spirally sloping floor 78 extends between the annular inner and outer partitions above the base wall. The liquid collecting chamber 26 is thus formed by the inner, outer and floor partitions outside and beneath the side wall of the basket.

The support ring 36 is formed with an upwardly facing surface 80. Accordingly, the chambering unit is supported on the support ring with the respective sealing surfaces in confronting relation, that is, downwardly facing surface 64 seated on the upwardly facing surface 80. A gasket 82 may be interposed between the surfaces to insure that a liquid tight seal is established therebetween.

The annular chambering unit is secured to the support ring by a plurality of bolts 84 that extend vertically through the support ring into the base wall 62. The bolts are accessible from below the support ring so that the chambering unit can be easily assembled or disassembled from the remainder of the machine.

The outer annular partition 66 is provided at its upper end with labryinth seal, generally indicated at 86, that extends into close proximity to and cooperates with a ring structure 88 mounted at the upper or large diameter end of the basket 12 to direct liquid into the liquid collecting chamber.

Furthermore, solids are discharged radially outwardly and over the ring structure into the solids collecting chamber 28 which is defined by the curb wall, the outer annular partition and the column 34.

The lower or smaller end 76 of the basket 12 has a cylindrical skirt 89 depending therefrom and spaced radially outwardly in concentric overlapping relation to the inner partition 72. Coaction of the skirt and inner portion also directs liquid into the liquid collecting chamber.

The floor partition 78 and base wall 62 have an opening 90 in the lowermost region of the floor partition that communicates, through a similar opening 92 in the support ring 36, with a radially outwardly directed liquid discharge tunnel 94. The belt tunnel 41 extends beneath and substantially coincident with the liquid discharge tunnel across the solids collecting space or chamber 28 and together with the liquid discharge tunnel define the stiffening structure 41 previously mentioned. Therefore space is efficiently used within the machine and minimal obstruction to outflow of solids and liquids is presented.

The chambering unit comprising the base, the inner, the outer partitions and the spirally sloping floor partition may be assembled as an integrated structure and seated on and secured in fixed relation to the support ring 36. The chambering unit provides advantages in that the continuous centrifugal machine may be modularly assembled. In particular, the chambering unit 60 may be mounted on the support ring 36 prior to assembly with the basket and bearing housing assembly and final connection to the motor. Alternatively and advantageously, the chambering unit can be assembled with the basket and bearing housing assembly first, all of these components then being mounted together simultaneously on the support ring 36. The liquids discharge openings 90 and 92 are, of course, registered during assembly of the chambering unit with the ring flange 36 to permit liquid discharge through the radially extending discharge tunnel 92.

Moreover, the novel configuration of the support ring and base wall and the seal established therebetween eliminates prior slip joints that were both difficult to assemble and adjust for a liquid tight seal.

A preferred embodiment of the continuous centrifugal machine of the present invention has been described above in detail. Modification may be made to the described structure in order to adapt it to particular applications.

What is claimed is:

1. In a continuous centrifugal machine including a rigidly fixed base structure, a bearing housing, a normally vertical basket shaft journalled for rotation on bearings in said bearing housing, an upwardly open frusto-conical centrifugal basket secured to the upper end of said shaft for rotation therewith, a stationary curb wall mounted on said base structure and surrounding said basket, means for resiliently mounting said bearing housing to permit gyration of said basket about a point on the axis of said shaft, rotary drive means including a motor mounted to one side of said curb wall, and means connecting said motor with the lower end of said shaft for rotating said basket, the improvement comprising:

an upwardly facing radial support ring mounted on said base structure inside said curb wall and surrounding said housing mounting means, and an annular chambering unit formed as an integrated structure and supported on said support ring in a space between the side wall of said basket and said curb wall, said chambering unit including a radial annular base wall having a downwardly facing surface seated on said support ring, radially spaced inner and outer annular partitions rigidly mounted on and extending upwardly from said base wall and having respective upper ends disposed adjacent the lower and upper ends respectively of said basket side wall, and a floor partition extending about, radially spanning the space between, and rigidly secured to said annular partitions, at least a portion of said floor partition being spaced above said base wall and coacting therewith to fix said annular partitions rigidly in radially spaced relation, said partitions together forming a liquid collecting chamber directly outside and under said basket side wall and spaced radially inward from said curb wall, said bearing housing mounting means being fixed to portions of said base wall and being located radially inside and accessible for adjustment from below said support ring and said base wall; said bearing housing mounting means, said chambering unit, said bearing housing, said basket shaft, and said basket constituting a unitary assembly that as a unit is assembleable onto and removable from said support ring inside said curb wall.

2. A continuous centrifugal machine according to claim 1, said outer annular partition comprising on an upper portion thereof means coacting with means on the upper end of said basket side wall to direct into said collecting chamber liquid thrown from the outer side of the basket near its upper end, the lower end of said basket wall having means thereon extending over the upper end of said inner partition for directing liquid into said collecting chamber, said base wall and said support ring having an opening therethrough for conducting liquid from said collecting chamber and said floor partition being spaced above said base wall and sloped spirally toward said opening for flowing liquid thereinto.

3. A continuous centrifugal machine according to claim 1, said base wall and said support ring having an opening therethrough for conducting liquid from said collecting chamber, said base structure comprising a liquid conducting tunnel extending radially away and downward from said opening, said motor connecting means including a driven belt pulley coupled with said lower end of said basket shaft and an endless driving belt coupling said pulley with a driving pulley driven by said motor; said base structure further comprising a radial tunnel extending beneath and substantially coincident with said liquid conducting tunnel and through which said belt extends between said pulleys.

4. A continuous centrifugal machine according to claim 1, 2, or 3, and means comprising a plurality of bolts extending vertically through and accessible from beneath said support ring and said base wall for securing said chambering unit in the machine.

* * * * *